United States Patent [19]
Letter

[11] 3,713,996
[45] Jan. 30, 1973

[54] ELECTROSENSITIVE RECORDING MEDIA
[75] Inventor: Eugene C. Letter, Penfield, N.Y.
[73] Assignee: Bausch & Lomb Incorporated, Rochester, N.Y.
[22] Filed: Jan. 6, 1971
[21] Appl. No.: 104,513

Related U.S. Application Data
[63] Continuation-in-part of Ser. No. 791,920, Jan. 17, 1969, abandoned.

[52] U.S. Cl. ..................... 204/2, 117/201, 346/74 E
[51] Int. Cl. ...... C23c 13/00, B41m 5/20, G03g 17/00
[58] Field of Search ......... 204/2; 117/71 R, 201, 217; 346/135, 74 E

[56]             References Cited
                 UNITED STATES PATENTS

| | | | |
|---|---|---|---|
| 3,138,547 | 6/1964 | Clark | 204/2 |
| 3,303,341 | 2/1967 | Fram et al. | 96/82 |
| 3,330,681 | 7/1967 | Scharf et al. | 117/71 R |
| 3,463,659 | 8/1969 | Dragoon et al. | 117/71 R |
| 238,931 | 3/1881 | Leggo | 204/2 |
| 2,251,742 | 8/1941 | Kline | 204/2 |
| 2,425,742 | 8/1947 | Kline | 204/2 |

Primary Examiner—John H. Mack
Assistant Examiner—T. Tufariello
Attorney—Hoffman Stone and Frank C. Parker

[57]             ABSTRACT

Electrosensitive recording media comprising a base of insulating sheet material such as paper, a reflective metallic film supported on the base, and a solid state electrolyte constituted by a base metal halide in a very finely divided, practically continuous layer adherently covering the metallic film. The metal and the electrolyte are selected from among those that will react with each other in the dry state when they are electrolyzed. Marks are made by passing currents from a stylus through the electrolyte to the metallic film, causing a reaction to occur locally between the electrolyte and the metal to produce a colloidal metallic precipitate that appears dark against the reflective background of the film.

6 Claims, 3 Drawing Figures

PATENTED JAN 30 1973 3,713,996

EUGENE C. LETTER
INVENTOR.

BY James C. Simmons
Attorney

ELECTROSENSITIVE RECORDING MEDIA

BRIEF DESCRIPTION

This application is a continuation-in-part of the co-pending application of the same title, Ser. No. 791,920, filed Jan. 17, 1969, assigned to the present assignee, and now abandoned.

This invention relates to electrosensitive recording media of the kind in which permanent visible marks may be made by electrolysis.

The media of the invention react to form visible marks in response to the passage of electric current through a solid state electrolyte in contact with an electrolyzable metal. The media are highly sensitive and also capable of extremely fine resolution.

Briefly, according to the invention, an electrosensitive medium comprises an insulating base such as, for example, a sheet of paper, or plastic, or a glass body. A fairly thin film of metal is carried on the surface of the base and is covered over the area portion where marks are to be made by a solid state electrolyte capable of reacting with the metal in response to an electric current. A selected portion of the metal film is preferably left uncovered to provide a contact area for a counter electrode. Marking is done with an electric stylus, passing limited currents through the electrolyte to the metal film.

The electrolyte reacts with the metal film in a region directly under the stylus, oxidizing it and producing a dark, non-reflecting metallic precipitate. Initially, the metal film is bright and shiny. In the regions where it has been oxidized it turns dark, creating a mark that contrasts sharply with the surrounding non-oxidized portion of the film.

The electrolysis is self-limiting in that as the metal film becomes oxidized it loses its conductance and changes to an insulator. It is, therefore, not possible for the stylus to weld itself to the metal film, and the principal effect of increasing the electrolyzing current (or voltage) is to enlarge the oxidized area. If very small currents are used, the oxidized area is very small, and, if larger currents are used, the area may be extended to slightly beyond the area in contact with the stylus.

It also turns out that the marks on the media of the invention are well suited for automatic detection. Each mark, whether large or small, includes a border portion where the electrolyte has been either removed or significantly reduced in thickness and the metal film has not been oxidized but remains clear, shiny, and exposed. The mark may be located by running a stylus upon the medium with a voltage between it and the counter electrode lower than the threshold voltage needed for electrolysis. No current flows while the stylus is upon unmarked regions of the medium because at the low voltage the solid electrolyte is highly insulating. When the stylus reaches the border portion of a mark, however, current flows readily because the stylus comes into contact with the exposed metal film in the border portion of the mark. If the mark is significantly wider than the area of contact of the stylus, two output signals are noted as the stylus crosses the mark. If the mark is narrower than the contact area, only one signal is produced.

The marks may also be detected automatically by noting the increase in electrical resistance when the reading stylus reaches the median, darkest part of the mark. In these areas, the electrical resistance between the stylus and the metal film is significantly greater than in unmarked areas of the medium.

The media may also be designed for magnetic reading. In this case the metal film includes a ferromagnetic material such as iron, or an alloy of iron and nickel, preferably covered with a thin layer of silver to optimize the contrast for optical reading. In the electrolyzed areas the metal film is reacted and the permeability is much less than in the unmarked areas.

Silver is the preferred metal for the metal film partly because of its high electrical conductivity, and mostly because of its unique chemical properties, particularly in respect of the halogens. It can be readily oxidized by electrolysis with a halide in the solid state.

The solid state electrolytes are the base metal halides and mixtures of them. Any base metal halide obtainable in an anhydrous form will work in the practice of the invention. Ordinarily, to achieve satisfactory adherence of the halide to the metal film, it is necessary to deposit the halide by evaporation in vacuo, and for deposition by this method, the halide must be anhydrous. Magnesium fluoride, by contrast, forms an aqueous gel that can be readily roll-coated on the metal film in the form of a smooth, continuous, highly adherent, and dry layer. Magnesium fluoride, therefore, is the preferred electrolyte for use in cases where it is desired to take advantage of the economy of roll-coating.

The metal films are typically about 1 micron thick or slightly less, and the electrolyte layers are somewhat thicker. The electrolytes are applied in quantities slightly greater than the stoichiometric quantities needed to react with the metal films, thus insuring electrolysis through the entire thickness of the film.

The media are highly sensitive; the electrolyzing voltages are typically in the range of about 4 to 60 volts, the larger values in the range being used primarily when the marking is done by brief bursts of current, and the smaller values in the range being used primarily for continuous marking.

DETAILED DESCRIPTION

Representative embodiments of the invention will now be described in connection with the accompanying drawing, wherein.

Figure 1:
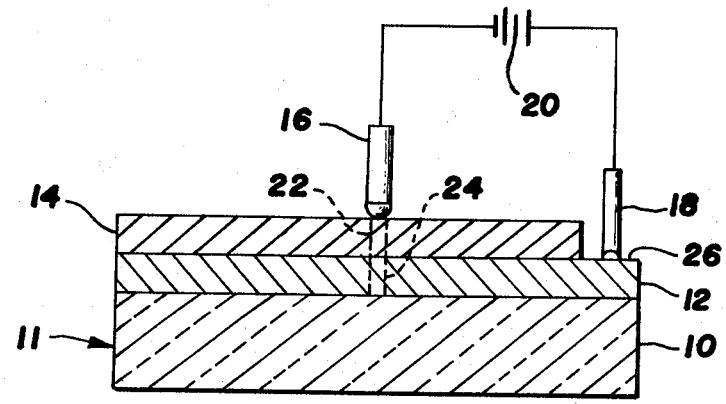
FIG. 1 is a schematic, cross-sectional view, on a distorted scale, of an electrosensitive recording media according to a first embodiment of the invention.

The recording medium 11 shown in FIG. 1 includes an insulating substrate 10 which may be, for example, of paper or plastic sheet material, an electrically continuous film 12 of a halogen-reactable metal on the surface of the substrate, and a very finely divided, practically continuous, and adherent layer 14 of a solid state electrolyte on top of the metal film 12. The electrolyte 14 is a base metal halide capable of electrolytically reacting with the metal 12.

The substrate 10 may be of any desired insulating material. Its surface is preferably slightly rough and light dispersive rather than specularly reflective, in order to enhance the contrast of the marks formed.

Silver is the preferred metal for the metal film 12 because of its unique chemical nature and the ease with which it reacts in the solid state with the base metal halides under electrolysis. In some cases, the metal adjacent to the stylus is halogenated and remains as a halide after the electrolysis. In these cases, the base metal is reduced and precipitated in situ to form the dark mark. In other cases such as where the base metal constituent of the halide is very highly reactive, e.g., sodium or magnesium, it is believed that the metal of the film is halogenated only during the electrolysis and is reduced immediately thereafter by the reactive base metal, with the result that the original halide layer is largely reconstituted and the colloidal precipitate is formed by the momentarily halongenated metal of the film. In both cases the precipitate stands out as a dark mark against the bright and reflective, unmarked regions of the film. In the latter cases after the mark is produced the electrolyte 14 may be washed away, thereby desensitizing the medium without affecting the mark. In both cases, however, the light transmission of the marked region of the two-layer film is higher than the light transmission of the original metal film 12 so that the mark may be viewed as a transparency, i.e., a relatively transparent area in an otherwise relatively opaque medium.

When the media are designed for automatic magnetic reading, it is important that the ferromagnetic film not be reduced following the electrolysis, and, accordingly, in these cases halides of relatively non-reactive base metals such as, for example, lead or magnesium fluoride should be selected for the electrolyte layer.

Magnesium fluoride is the preferred material for the electrolytic layer 14 because it forms an aqueous gel and can be easily roll-coated in the form of a dry, smooth, continuous, and adherent layer on the metal film 12.

Marks are made on the recording medium by applying a voltage between a stylus 16 held in contact with the electrolytic layer 14 and a counter electrode 18, which may, for example, engage an uncovered surface portion 26 of the metal film 12. Alternatively, the counter electrode 18 may have a sharpened point, or edge and be pressed upon the electrolyte layer 14 sufficiently hard to penetrate it and come into contact with the metal film 12. The voltage may be d.c., as indicated by the schematic showing of the battery 20, or, if desired, an alternating voltage may be impressed, in which case, the dry electrolytic cell formed by the electrolyte 14 and the metal film 12 acts as a rectifier, and primarily only d.c. current flows in the electrolyzing direction.

The metal film 12 becomes halogenated in a region adjacent to the stylus 16, and the electrolyte 14 is reduced. Thereafter, once the current flow stops, the chemical action depends upon the nature of the metal in the metal film 12 and the base metal of the electrolyte 14. In most cases, the metal in the region 24 remains halogenated and in a relatively transparent condition, and the base metal of the halide in the region 22 remains reduced and precipitated out in a finely particulate form. In other cases, where the base metal is highly reactive, as, for example, when the electrolyte is sodium chloride or magnesium fluoride it is thought that once the current flow stops the halogenated metal from the film 12 in the region 24 is reduced and precipitated in finely divided form, and the base metal becomes re-oxidized by the halogen. In either case, the precipitated reduced metal left in the region 22 or the region 24 presents a very dark appearance against the reflective background provided by the surface of the metal film 12.

Figure 2:
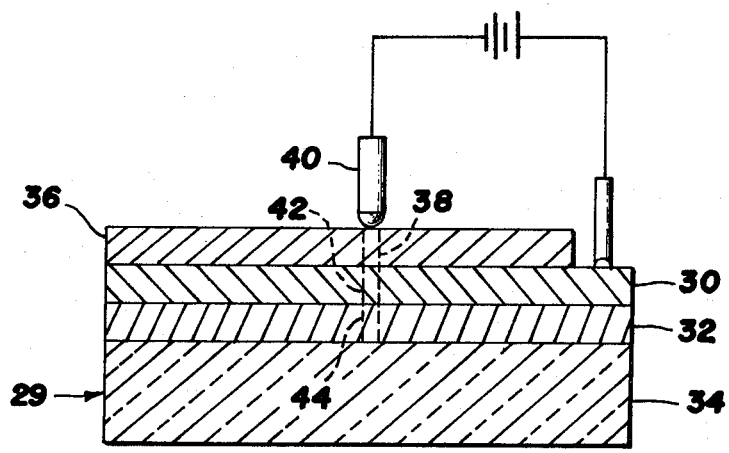
FIG. 2 is a cross-sectional view, in schematic form, and on a distorted scale, of an electrosensitive recording medium according to a second, modified embodiment of the invention.
Figure 3:
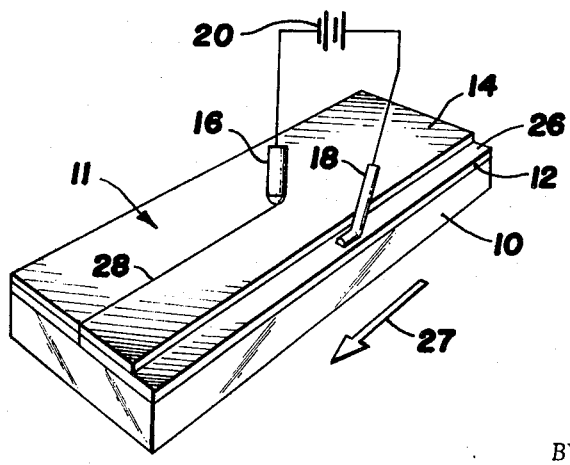
FIG. 3 is a schematic view, partly in perspective, of a recording system using the electrosensitive recording medium of FIG. 1.

An alternative form of the invention is illustrated in FIG. 2, in which the recording medium 29 is supported on an insulating substrate 34 and the metallic film is made of two layers, 30 and 32. The layer 32 in contact with the substrate 34 may be, for example, of copper and relatively thick, approaching one micron in thickness, to provide the necessary degree of conductivity, while the second layer 30 on which the electrolyte 36 rests is a relatively thin layer, say about 0.1 micron thick, of silver, which presents a brighter, more highly reflective surface than does copper. In this case the electrolyte film 36 must include halides other than magnesium floride because magnesium floride does not electrolyze satisfactorily with metals other than silver so far as is presently known, and to make a satisfactory mark it seems to be necessary to electrolyze the copper as well as the thin silver layer. The electrolyte 36 may be selected from among any of many base metal halides capable of reacting with copper, all of which will also react with silver.

The table immediately following presents a list of experimental results with various different electrolytes, metals in the metal films, and substrate materials, together with the minimum voltages required to produce satisfactory marking and ranges of optimum voltages that have been found to be satisfactory and to produce satisfactory marking for continuous recording of lines on the medium. For high speed pulse recording the voltages should be increased above the optimum voltages or ranges given.

Marking resolution achievable in the practice of the invention is of a high order. Clear marks have been produced smaller than 15 microns in diameter, particularly in the preferred forms of the invention.

The metal films 12 and 32 may be applied as desired by evaporation techniques, or, especially in the cases of silver and copper, by chemical reduction from aqueous solutions.

TABLE I

| NO. | Electrolytic layer | Metal Film | substrate | Min. Volts | Optimum Volts |
|---|---|---|---|---|---|
| 1. | Pb F$_2$ | Ag | Frosted Acetate | 4 | 4 |
| 2. | Pb F$_2$ | Ag | Clay Filled | 4 | 5 |
| 3. | Pb F$_2$ | Ag | Paper | 5 | 6-10 |
| 4. | Pb F$_2$ | Ag | Trace Paper | 5 | 7 |
| 5. | Pb F$_2$ | Ag | Chart Paper | 5 | 5 |
| 6. | Pb F$_2$ | Ag | Frosted Mylar | 4 | 4 |

| | | | | | |
|---|---|---|---|---|---|
| 7. | Pb F$_2$ | Cu | Paper | 5 | 10 |
| 8. | Pb F$_2$ | Ag + Cu | Paper | 5 | 10 |
| 9. | Pb F$_2$ | Ag + Cu | Paper | 5 | 10 |
| 10. | Pb F$_2$ | Al + Ag | Paper | 5 | 10 |
| 11. | Pb F$_2$ | 70 Cu 30 Sn | Paper | 5 | 20 |
| 12. | Pb F$_2$ | 70 Cu 30 Sn + Ag | Paper | 5 | 5 |
| 13. | Pb F$_2$ | Ag + Au | Paper | 5 | 5 |
| 14. | Pb F$_2$ | Speculum Alloy | Paper | 5 | 20-25 |
| 15. | Ba F$_2$ | Ag | Paper | 8 | 15 |
| 16. | Ba F$_2$ | Cu | Paper | 15 | 20 |
| 17. | Ba F$_2$ | 70 Cu 30 Sn | Paper | 20 | 20 |
| 18. | Ba F$_2$ | 70 Cu 30 Sn + Ag | Paper | 10 | 12 |
| 19. | Ba F$_2$ | Ag + Au | Paper | 10 | 15 |
| 20. | Ba F$_2$ | Al | Paper | 19 | 20 |
| 21. | Ba F$_2$ | Cu + Ag | Paper | 10 | 20 |
| 22. | 9 La F$_3$·Sr F$_2$ | Ag | Paper | 10 | 10-25 |
| 23. | 9 La F$_3$·Sr F$_2$ | Cu | Paper | 10 | 20-25 |
| 24. | 9 La F$_3$·Sr F$_2$ | Al | Paper | 40 | 40-50 |
| 25. | Ca F$_2$ | Ag | Paper | 5 | 7.5-10 |
| 26. | 9 Ca F$_2$·Na F | Ag | Paper | 5 | 10 |
| 27. | Mn F$_2$ | Ag | Paper | 5 | 7.5-10 |
| 28. | Mn F$_2$ | Ag | Chart Paper | 5 | 6-7 |
| 29. | Pb I$_2$ | Ag | Paper | 5 | 10-15 |
| 30. | Pb Cl$_2$ | Ag | Paper | 5 | 10-15 |
| 31. | Na Cl | Ag | Paper | 5 | |
| 32. | Na Cl | Cu | Paper | 5 | 5 |
| 33. | Pb F$_2$ | Cu + Zn | Paper | 10 | 10-15 |
| 34. | Pb F$_2$ | Pb | Paper | 4 | 5-10 |
| 35. | BaF$_2$, SnF$_2$, CaF$_2$ (mixture) | Ag | Paper | 5 | 7 |
| 36. | Co-precipitate of Na Ca Cd Y F$_8$ | Ag | Paper | 5 | 10 |
| 37. | NaF | Ag | Paper | 10 | 20 |
| 38. | LiF | Ag | Paper | 5 | 7 |
| 39. | Na Cl + Ca F$_2$ * | Ag | PaPer | 10 | 25 |
| 40. | Pb F$_2$ | Sn | Paper | 5 | 7 |

*Discrete layers

What is claimed is:

1. An electrosensitive recording medium comprising:
   a. an insulating support,
   b. an opaque metallic film approximately a micron thick adherently disposed on said support,
   c. a practically continuous layer of a solid state electrolyte adherently disposed on said metallic film, said electrolyte layer consisting of a base metal halide or a mixture of base metal halides, and being capable of electrolytically reacting with said metal film.

2. An electrosensitive recording medium according to claim 1, wherein the quantity of said electrolyte is slightly greater than the stoichiometric quantity needed to react completely with said metal film.

3. An electrosensitive recording medium according to claim 1, wherein said metallic film is of a metal selected from the group consisting of silver, copper, and copper alloys.

4. An electrosensitive recording medium according to claim 1, wherein said metallic film is composed of two strata, the first stratum being of a base metal and directly on said support, the second stratum being of silver and thinner than said first stratum.

5. An electrosensitive recording medium according to claim 1, wherein said metallic film and said layer of electrolyte are each on the order of 1 micron in thickness.

6. An electrosensitive medium according to claim 1 wherein said metallic film includes a substantial proportion of a ferromagnetic material.

* * * * *

UNITED STATES PATENT OFFICE
CERTIFICATE OF CORRECTION

Patent No. 3,713,996  Dated January 30, 1973

Inventor(s) Eugene C. Letter

It is certified that error appears in the above-identified patent and that said Letters Patent are hereby corrected as shown below:

Col. 5, line 4, change " 9.  $PbF_2$  Ag + Cu "

to -- 9.  $PbF_2$  Al + Cu --

Signed and sealed this 3rd day of July 1973.

(SEAL)
Attest:

EDWARD M. FLETCHER, JR.  Rene Tegtmeyer
Attesting Officer  Acting Commissioner of Patents